US008565173B2

United States Patent
Park et al.

(10) Patent No.: US 8,565,173 B2
(45) Date of Patent: Oct. 22, 2013

(54) METHOD AND APPARATUS FOR RESOURCE ALLOCATION SCHEDULING IN WIRELESS COMMUNICATION SYSTEM

(75) Inventors: Hye-Mi Park, Seoul (KR); Jeong-Heon Kim, Anyang-si (KR); Byung-Chan Ahn, Seoul (KR); Won-Young Park, Seoul (KR); Sung-Ha Kim, Seoul (KR); Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 13/022,927

(22) Filed: Feb. 8, 2011

(65) Prior Publication Data

US 2011/0194512 A1 Aug. 11, 2011

(30) Foreign Application Priority Data

Feb. 10, 2010 (KR) ........................ 10-2010-0012232

(51) Int. Cl.
*H04W 28/06* (2009.01)
*H04W 72/10* (2009.01)
*H04W 72/04* (2009.01)
*H04J 3/00* (2006.01)

(52) U.S. Cl.
USPC .............................. 370/329; 370/345; 370/311

(58) Field of Classification Search
None
See application file for complete search history.

(56) References Cited

U.S. PATENT DOCUMENTS

| 2008/0034107 | A1* | 2/2008 | Lee et al. ........................ 709/232 |
| 2008/0056172 | A1* | 3/2008 | Nakatsugawa ................ 370/315 |
| 2008/0075027 | A1* | 3/2008 | Lee et al. ........................ 370/311 |
| 2008/0181175 | A1* | 7/2008 | Lee et al. ........................ 370/329 |
| 2009/0109960 | A1* | 4/2009 | Chen et al. ..................... 370/352 |
| 2010/0008332 | A1* | 1/2010 | Balachandran et al. ....... 370/336 |

\* cited by examiner

*Primary Examiner* — Steven H Nguyen
*Assistant Examiner* — Jason Harley
(74) *Attorney, Agent, or Firm* — Jefferson IP Law, LLP

(57) ABSTRACT

A method and an apparatus for resource allocation scheduling in a wireless communication system are provided. The apparatus includes a scheduler for, if an UpLink (UL) scheduling for scheduling an allocation order of UL resources is performed prior to a DownLink (DL) scheduling for scheduling an allocation order of DL resources, setting a size $\alpha$ representing a size in which a DL burst region is maximally allocated in a DL sub frame, for, if the DL scheduling is performed prior to the UL scheduling, setting a size $\beta$ representing a size in which the DL burst region is maximally allocated in the DL sub frame, for determining whether to discard a DL Medium Access Control (MAC) management message to be transmitted by using the size $\beta$, and for, if it is not determined to discard the DL MAC management message, determining a priority of a DL scheduling and a UL scheduling by using the size $\alpha$ and first performing one of the DL scheduling and the UL scheduling in accordance with the determined priority.

19 Claims, 5 Drawing Sheets

METHOD AND APPARATUS FOR RESOURCE ALLOCATION SCHEDULING IN WIRELESS COMMUNICATION SYSTEM

PRIORITY

This application claims the benefit under 35 U.S.C. §119(a) of a Korean patent application filed on Feb. 10, 2010 in the Korean Industrial Property Office and assigned Serial No. 10-2010-0012232, the entire disclosure of which is hereby incorporated by reference.

BACKGROUND OF THE INVENTION

1. Field of the Invention

The present invention relates to a method and an apparatus for controlling a wireless communication system. More particularly, the present invention relates to a method and an apparatus for resource allocation scheduling in a wireless communication system.

2. Description of the Related Art

The Institute of Electrical and Electronics Engineers (IEEE) 802.16e-based communication system is a system employing an Orthogonal Frequency Division Multiple Access (OFDMA) scheme in order to support a broadband transmission.

The IEEE 802.16e-based communication system channels multiple subcarriers among all subcarriers having orthogonality and forms sub-channels. Further, in the IEEE 802.16e-based communication system, data transmission is performed frame by frame, and sub-channels during a specific symbol duration within a single frame are combined to generate a slot, which is a minimum unit having two-dimensional resources of time and frequency.

A downlink sub frame included in a single frame includes a DownLink (DL)-MAP region and an UpLink (UL)-MAP region. The base station includes DL data burst allocation information and UL data burst allocation information of a mobile station to the DL-MAP region and the UL-MAP region, respectively, so that the corresponding data burst can be transmitted in the DL and UL data areas by using the multiple slots.

Hereinafter, a structure of a frame in a conventional wireless communication system will be described with reference to FIG. 1.

FIG. 1 is a view illustrating a structure of a frame in a wireless communication system according to the related art.

Referring to FIG. 1, the frame includes a DL sub-frame 100 and a UL sub-frame 150.

The DL sub-frame 100 includes a preamble region 110, a DL-MAP region 120, a UL-MAP region 130, and a DL burst region 140. The UL sub-frame 150 includes a UL burst region 160.

The preamble region 110 is used in order to transmit a preamble signal for acquisition of synchronization between a base station and a mobile station.

The DL-MAP region 120 and the UL-MAP region 130 are used for transmission of a DL-MAP message and a UL-MAP message, respectively. The DL-MAP message and the UL-MAP message include information indicating whether a DL burst region and a UL burst region are allocated to each of the mobile stations, and location information of the allocated DL burst region and UL burst region and modulation scheme information used when the DL burst region and the UL burst region have been allocated to each of the mobile stations.

The DL burst region 140 is used for transmission of a DL data burst and the UL burst region 160 is used for transmission of a UL data burst.

The UL-MAP message is transmitted through the DL sub-frame 100, so that the base station generally first performs a UL scheduling for scheduling of an allocation order of UL resources prior to DL scheduling for scheduling of an allocation order of DL resources.

FIG. 2 is a diagram illustrating a structure of a frame after the performance of UL scheduling according to the related art.

Referring to FIG. 2, when the UL scheduling is performed, a remaining region 230, other than a preamble region 210 and a UL-MAP region 220, exists in a DL sub-frame 200. Therefore, after the performance of the UL scheduling, the allocation of the DL data burst is determined in accordance with a size of the remaining region 230.

When a size of the remaining region 230 is larger than a size of the DL data burst to be allocated, there is no problem regarding the allocation of the DL data burst to the remaining region 230. However, in the alternative case in which the size of the DL data burst to be allocated is larger than a size of the remaining region 230, the DL data burst can still be allocated to the remaining region 230 depending on whether the DL data burst can be fragmentized.

Specifically, the DL data burst, which can be fragmentized, can be fragmentized and allocated to the remaining region 230, to be transmitted. However, if the size of the remaining region 230 is smaller than that of a DL data burst that cannot be fragmentized, such as a Medium Access Control (MAC) management message and Hybrid Automatic Repeat Request (HARQ) retransmission traffic, then a problem occurs in that it is impossible to allocate the DL data burst to the remaining region 230. Therefore, there occurs a problem in that the DL data burst that cannot be allocated cannot be transmitted.

As an example, a mobile station located at an edge of a cell uses a Modulation and Coding Scheme (MCS) level relatively lower than that used in another mobile station within the cell, so that when the UL-MAP is first allocated to the DL sub frame, a space for the allocation of the DL data burst is lacking, so that there may occur a problem of the transmission interruption of the DL data burst. This is because the mobile station located in the edge of the cell requires a relatively large DL burst region in comparison with the other mobile station.

A size of the DL data burst to be transmitted is determined according to a size of an Automatic Repeat Request (ARQ) block. Therefore, in order to address the above problem, there may be conceived a solution of reducing a size of the ARQ block, but the number of ARQ blocks, which can be transmitted one time, are limited according to an ARQ window size. Therefore, in the event of reducing the size of the ARQ block, there occurs a problem of a decrease in throughput according to the transmission/reception of the data burst.

Further, a UL signaling message or a DL MAC management message including a Basic-Connection Identifier (B-CID) and a Physical-Connection Identifier (P-CID) is a sequentially transmitted message, so that in the event of the transmission interruption, all of the subsequent UL signaling message or DL MAC management message cannot be transmitted for several frames according to a size of a UL-MAP region. In this respect, there occurs a problem in deterioration of a success rate of a handover or Quick Connection Setup (QCS) of the mobile station. Likewise, when the transmission of a broadcast MAC management message related to an operation of a system is interrupted, there occurs a serious situation of the failure of the operation of the system.

Accordingly, there is a need for an improved method and an apparatus for resource allocation scheduling in a wireless communication system.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for resource allocation scheduling in a wireless communication system.

Another aspect of the present invention is to provide a resource allocation scheduling method and apparatus for determining an order of an Uplink (UL) resources allocation scheduling and a Downlink (DL) resources allocation scheduling, in order to prevent interruption of the DL data burst transmission, such as a DL MAC management message, or the waste of UL resources.

In accordance with an aspect of the present invention, a method for resource allocation scheduling by a base station in a wireless communication system is provided. The method includes, if UL scheduling for scheduling an allocation order of UL resources is performed prior to DownLink (DL) scheduling for scheduling an allocation order of DL resources, setting a size α representing a size in which a DL burst region is maximally allocated in a DL sub frame, if the DL scheduling is performed prior to the UL scheduling, setting a size β representing a size in which the DL burst region is maximally allocated in the DL sub frame, determining whether to discard a DL MAC management message to be transmitted by using the size β, and if it is determined not to discard the DL MAC management message, determining a priority of DL scheduling and UL scheduling by using the size α and first performing one of the DL scheduling and the UL scheduling in accordance with the determined priority.

In accordance with another aspect of the present invention, an apparatus for resource allocation scheduling in a wireless communication system is provided. The apparatus includes a memory for storing a Medium Access Control (MAC) management message, and a scheduler for, if a UL scheduling for scheduling an allocation order of UL resources is performed prior to a DL scheduling for scheduling an allocation order of DL resources, setting a size α representing a size in which a DL burst region is maximally allocated in a DL sub frame, for, if the DL scheduling is performed prior to the UL scheduling, setting a size β representing a size in which the DL burst region is maximally allocated in the DL sub frame, for determining whether to discard a DL MAC management message to be transmitted by using the size β, and for, if it is determined not to discard the DL MAC management message, determining a priority of a DL scheduling and a UL scheduling by using the size α and first performing one of the DL scheduling and the UL scheduling in accordance with the determined priority.

According to an aspect the present invention, in the event that the DL scheduling is first performed prior to the UL scheduling in accordance with a condition, even if an allocation priority of a mobile station located in an edge of a cell is higher than that of another mobile station within the cell, the transmission of the DL data burst is not interrupted. Further, exemplary embodiments of the present invention address a problem of the transmission interruption of the MAC management message, so that the mobile station can conveniently perform the handover and maintain the communication with the base station. Further, exemplary embodiments of the present invention address the problem of a wireless communication system employing a Fractional Frequency Reuse (FFR) scheme, in which a Non-segmented Partial Usage of Subchannels (PUSC) zone that cannot be segmented is wasted since the region to which the MAP can be additionally allocated is insufficient.

Furthermore, exemplary embodiments of the present invention can efficiently change a scheduling priority in accordance with a traffic quantity, so that it is possible to achieve the effect of the general increase of performance of the wireless communication system.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
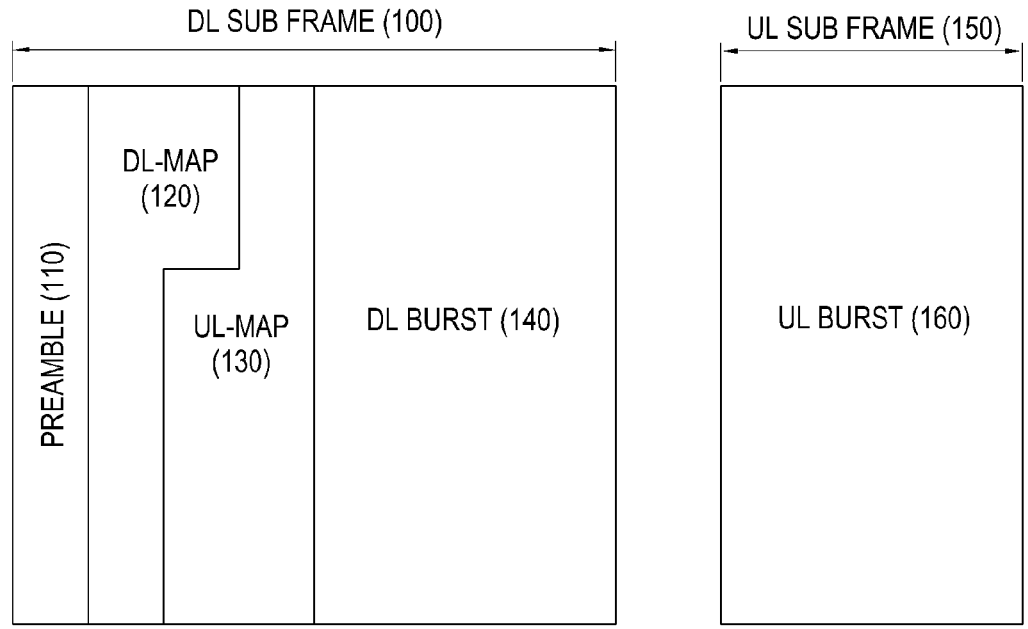
FIG. 1 is a diagram illustrating a structure of a frame in a wireless communication system according to the related art.
Figure 2:
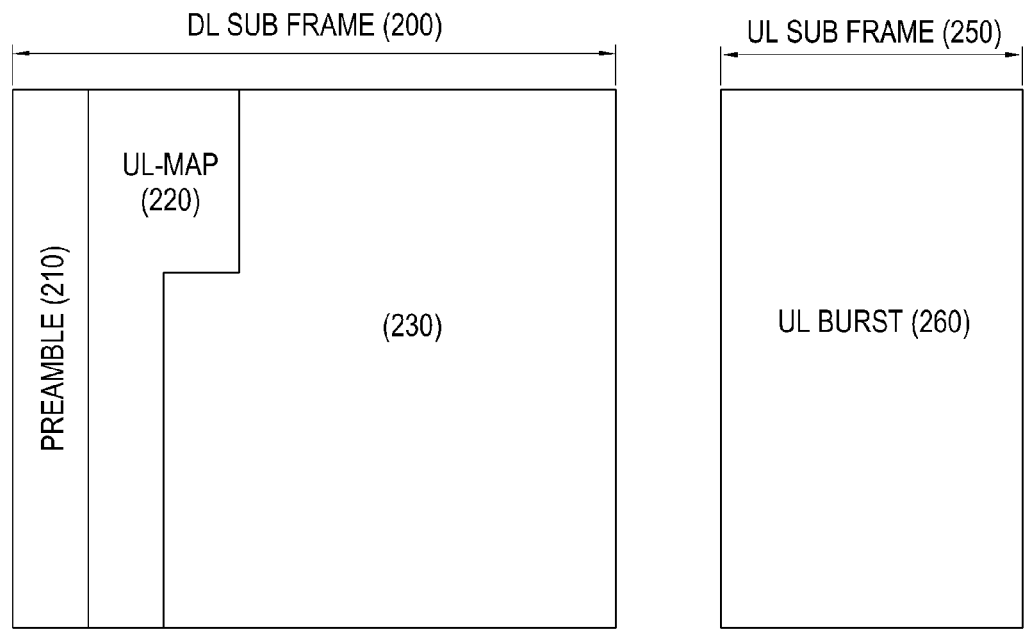
FIG. 2 is a diagram illustrating a structure of a frame after performance of UL scheduling according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention suggest a method and an apparatus for resource allocation scheduling in a wireless communication system, e.g. an Institute of Electrical and Electronics Engineers (IEEE) 802.16e-based communication system. More particularly, exemplary embodiments of the present invention suggest a method and an apparatus, by which an order of Uplink (UL) scheduling for scheduling an allocation order of UL resources and an order of Downlink (DL) scheduling for scheduling an allocation order of DL resources is determined, so that it can prevent the waste of the UL resource and address a problem of the transmission interruption of the DL data burst. The DL data burst includes, for example, a Medium Access Control (MAC) management message and Hybrid Automatic Repeat reQuest (HARQ) retransmission traffic.

There may occur a problem of the transmission interruption of the DL data burst due to a UL-MAP region allocated to a DL sub frame before the allocation of the DL data burst. Therefore, in order to address such a problem, the following exemplary methods can be considered.

First, an exemplary method of limiting a size of a UL-MAP region to a specific value can be considered. However, in the event of limiting the size of a UL-MAP region, a quantity of transmittable UL data burst is also limited, so that there occurs a problem of wasting the UL resource and the failure of the transmission of the UL data burst that has to be first transmitted prior to the DL data burst.

Next, an exemplary method of performing DL scheduling prior to UL scheduling can be considered. However, a base station generally allocates a DL data burst with maximum use of DL resources, so that in the event of first performing the DL scheduling prior to the UL scheduling, the UL-MAP region is lacking so that there occurs a problem of wasting the UL resources.

Further, an exemplary method of synthetically performing DL scheduling and UL scheduling in consideration of both UL resources and DL resources can be considered. However, it is difficult to actually implement this method and this method is not efficient because the UL resources and the DL resources must be simultaneously considered in every allocation of a DL or UL data burst, thereby increasing the complexity of the implementation.

Therefore, exemplary embodiments of the present invention suggest a method which can be actually and easily implemented and can more efficiently allocate UL resources and DL resources.

When DL scheduling is first performed prior to UL scheduling, there occurs a case in which UL resources are scarcely allocated, thereby causing a problem of waste of the UL resources and the degradation of the UL performance. In this respect, exemplary embodiments of the present invention first perform the DL scheduling prior to the UL scheduling at a period of a time interval in which the UL performance degrades up to a level just before the degraded UL performance affects the communication between a base station and a mobile station, and changes the scheduling order between the UL scheduling and the DL scheduling in an exceptional situation.

The exceptional situation in which the order of the UL scheduling and the DL scheduling changes is the following.

First, a size of UL signaling message including a Basic-Connection Identifier (B-CID) and a Physical-Connection Identifier (P-CID) related to an operation of a mobile station or a base station stored in a memory, such as a buffer, is compared with that of the DL MAC management message. Then, when a size difference between the two messages is equal to or larger than a threshold value, the base station first performs the scheduling of a link corresponding to the larger of the two messages.

For example, when a size difference between the UL signaling message and the DL MAC management message is equal to or larger than a threshold value and the size of UL signaling message is larger than that of the DL MAC management message, the base station first performs the UL scheduling, but in the contrasting case, the base station first performs the DL scheduling.

Second, when an allocation priority of a mobile station located in an edge of a cell is higher than that of another mobile station within the cell, the base station first performs the DL scheduling prior to the UL scheduling. Herein, the allocation priority is information representing how prior the DL resources have to be allocated to the mobile station for the transmission of the DL data burst.

The mobile station located in the edge of the cell generally uses a relatively low Modulation and Coding Scheme (MCS) level, so that the mobile station requires a relatively large DL burst region in comparison with the other mobile station within the cell. Therefore, when a UL-MAP is allocated to the DL sub frame in advance, the region to which the DL data burst is allocated is lacking, so that there occurs a problem of transmission interruption of the DL data burst.

Especially, in the wireless communication system employing a Fractional Frequency Reuse (FFR) scheme, when an allocation priority of the mobile station located in the edge of the cell is high, an allocation priority of a segmented Partial Usage of Subchannels (PUSC) zone becomes high, so that the region to which the MAP is to be additionally allocated becomes lack. In this respect, there occurs a problem in that the data burst is not allocated to a non-segmented PUSC zone.

Therefore, when the allocation priority of the mobile station located in the edge of the cell is high, it must prevent the occurrence of the problem of the transmission interruption of the DL data burst caused by the allocation of the UL-MAP through the preferential performance of the DL scheduling.

Third, when there are not many UL data bursts to be transmitted so that a large number of UL resources is left, the collection and transmission of the UL data burst is efficient to reduce the overhead of the MAP. Therefore, when the UL data burst to be transmitted is less than a threshold value, the base station first performs the DL scheduling prior to the UL scheduling. In this case, the scheduling is performed when the UL data burst is accumulated as much as at least the threshold value, so that it is possible to reduce the MAP overhead.

Hereinafter, a structure of a base station of a wireless communication system according to an exemplary embodiment of the present invention will be described with reference to FIG. 3.

Figure 3:
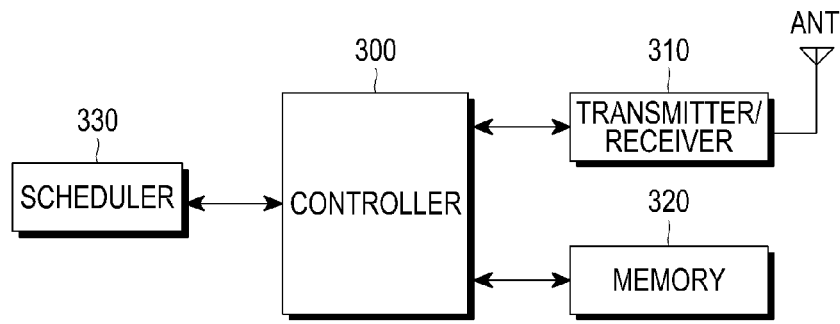
FIG. 3 is a block diagram illustrating a structure of a base station in a wireless communication system according to an exemplary embodiment of the present invention.

FIG. 3 is a block diagram illustrating a structure of a base station of a wireless communication system according to an exemplary embodiment of the present invention.

Referring to FIG. 3, the base station includes a controller 300, a transmitter/receiver 310, a memory 320, and a scheduler 330.

The controller 300 controls the transmitter/receiver 310, the memory 320, and the scheduler 330, and manages a general operation of the base station.

The transmitter/receiver 310 performs a wireless communication function of the base station. For example, the transmitter/receiver 310 transmits a DL data burst, such as a DL MAC management message, to a mobile station and receives the UL data burst from the mobile station.

The memory 320 stores a DL MAC management message to be transmitted to the mobile station, the UL data burst received from the mobile station, etc. The memory 320 may include, for example, a buffer.

The scheduler 330 sets a size of the DL burst region in the DL sub frame as two values α and β, in order to address the problem of the transmission interruption of the DL MAC management message, and performs the scheduling of determining an order of the UL scheduling and the DL scheduling by using the values α and β.

Hereinafter, an exemplary operation of the scheduler 330 will be more particularly described with reference to FIGS. 4 and 5.

Figure 4:
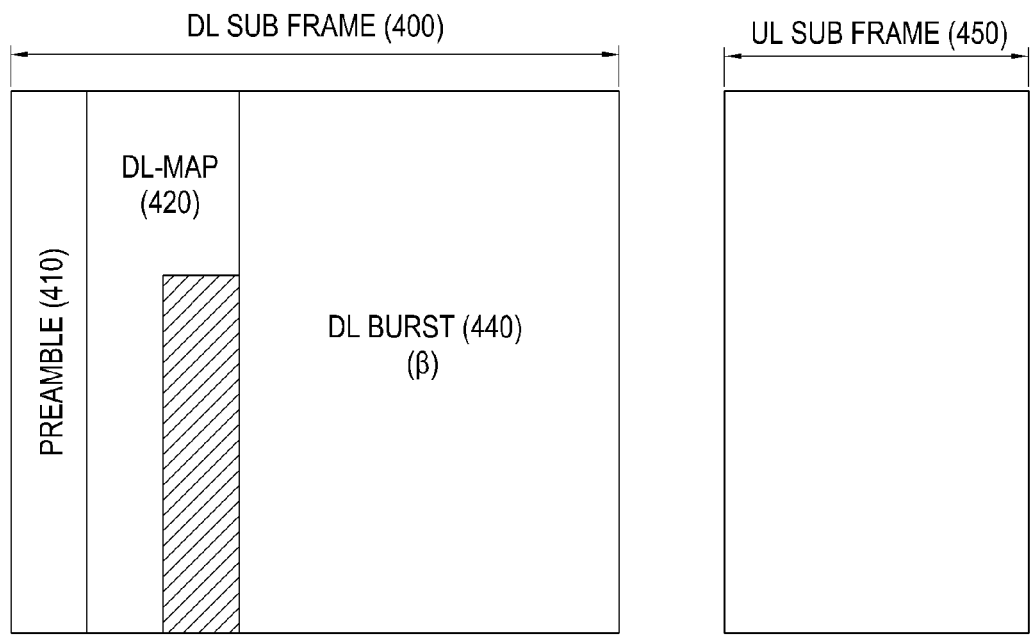
FIG. 4 is a diagram illustrating a structure of a frame when Downlink (DL) scheduling is performed prior to Uplink (UL) scheduling according to an exemplary embodiment of the present invention.

FIG. 4 is a diagram illustrating a structure of a frame when DL scheduling is performed prior to UL scheduling according to an exemplary embodiment of the present invention.

When the DL scheduling is first performed for DL subframe 400 including a preamble 410 prior to the UL scheduling for UL sub-frame 450, the scheduler 330 sets a size of a DL burst region 440 as a value β. The value β represents a size in which the DL burst region 440 is maximally allocated when a DL-MAP 420 region is allocated having a minimal size and a UL-MAP region is not allocated. The DL-MAP region 420 is allocated having a minimal size when a single DL data burst is allocated in the DL burst region 440.

Figure 5:
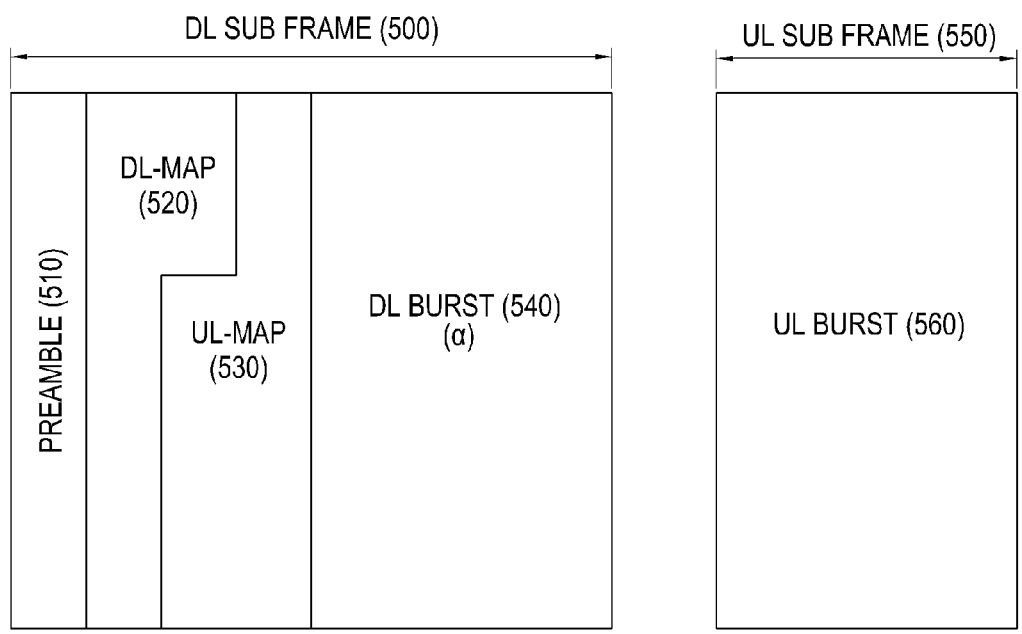
FIG. 5 is a diagram illustrating a structure of a frame when UL scheduling is performed prior to DL scheduling according to an exemplary embodiment of the present invention.

FIG. 5 is a diagram illustrating a structure of a frame when UL scheduling is performed prior to DL scheduling according to an exemplary embodiment of the present invention.

When the UL scheduling is first performed for UL subframe 550 including UL burst 560 prior to the DL scheduling for DL sub-frame 500 including a preamble 510, the scheduler 330 sets a size of a DL burst region 540 as a value α. The value α represents a size in which the DL burst region 540 is maximally allocated when a DL-MAP 520 region is allocated having a minimal size and a UL-MAP region 530 is allocated having an average size. The average size of the UL-MAP region 530 is set based on an average quantity of allocated UL resources during a preset time interval.

When the values α and β are set as described above, the scheduler 330 compares a size of the DL MAC management message to be transmitted with the value β.

When the size of the DL MAC management message is larger than the value β, the scheduler 330 deletes the DL MAC management message larger than the value β from a message queue of the memory 320. That is, the scheduler 330 discards the DL MAC management message that is larger than the value β.

This is because, when the size of the DL MAC management message is larger than the value β, the performance of the mobile station or the base station is degraded due to the transmission interruption of the MAC management message. Therefore, the scheduler 330 discards the DL MAC management message larger than the value β, so as to transmit a next DL data burst.

When the size of the DL MAC management message is equal to or less than the value β such that the scheduler 330 does not discard the DL MAC management message, the scheduler 330 compares a size the DL MAC management message to be transmitted with the value α.

When the size of the DL MAC management message is larger than the value α, the scheduler 330 first performs the DL scheduling prior to the UL scheduling. The frame structure when the UL scheduling is first performed prior to the DL scheduling is illustrated in FIG. 5. If the UL scheduling is first performed prior to the DL scheduling, the DL burst which has larger size than a cannot be allocated to the DL burst region.

Then, it is impossible to transmit the DL MAC management message to be transmitted. As such, there occurs a problem in that it is also impossible to transmit the DL data burst to be transmitted next in the DL MAC management message to be transmitted. Therefore, in order to prevent the occurrence of the problem, the scheduler 330 first performs the DL scheduling prior to the UL scheduling so that the DL MAC management message to be transmitted is allocated to the DL burst region.

When the DL MAC management message is equal to or less than the value α, the scheduler 330 determines if a size difference between the UL signaling message and the DL MAC management message is equal to or larger than a threshold value.

When the size difference between the UL signaling message and the DL MAC management message is equal to or larger than a threshold value, the scheduler 330 first performs the scheduling of a link corresponding to the larger of the two messages.

For example, when the size of DL MAC management message is larger, up to a threshold value, than that of the UL signaling message, the scheduler 330 first performs the DL scheduling prior to the UL scheduling.

When the size difference between the UL signaling message and the DL MAC management message is less than the threshold value, the scheduler 330 determines an allocation priority of the mobile station located in the edge of the cell. Then, the scheduler 330 determines if the allocation priority of the mobile station located in the edge of the cell is higher than an allocation priority of another mobile station within the cell.

When the allocation priority of the mobile station located in the edge of the cell is higher than the allocation priority of the other mobile station within the cell, the scheduler 330 first performs the DL scheduling prior to the UL scheduling. This is because the mobile station located in the edge of the cell requires the relatively large DL burst region in comparison with the other mobile station within the cell. Therefore, the scheduler 330 first performs the DL scheduling prior to the UL scheduling so as to prevent the occurrence of the problem of the transmission interruption of the DL data burst caused by the lack of the DL burst region.

When the allocation priority of the mobile station located in the edge of the cell is equal to or lower than the allocation priority of the other mobile station within the cell, the scheduler 330 determines remaining UL resources and determines if a quantity of remaining UL resources is equal to or larger than a threshold value.

When the quantity of remaining UL resources is equal to or larger than the threshold value, the scheduler 330 determines that there are not many UL data bursts to be transmitted through the UL. Therefore, in this case, it is preferred to collect the UL data burst in the single frame and transmit the collected UL data burst, so as to reduce the UL-MAP overhead. Therefore, when the quantity of remaining UL resources is equal to or larger than the threshold value, the scheduler 330 first performs the DL scheduling prior to the UL scheduling.

When the quantity of remaining UL resources is less than the threshold value, the scheduler 330 performs the UL scheduling and the DL scheduling in accordance with a period of a scheduling priority within a corresponding frame.

Next, an exemplary operation of a base station configured as described above will be specifically described.

Figure 6:
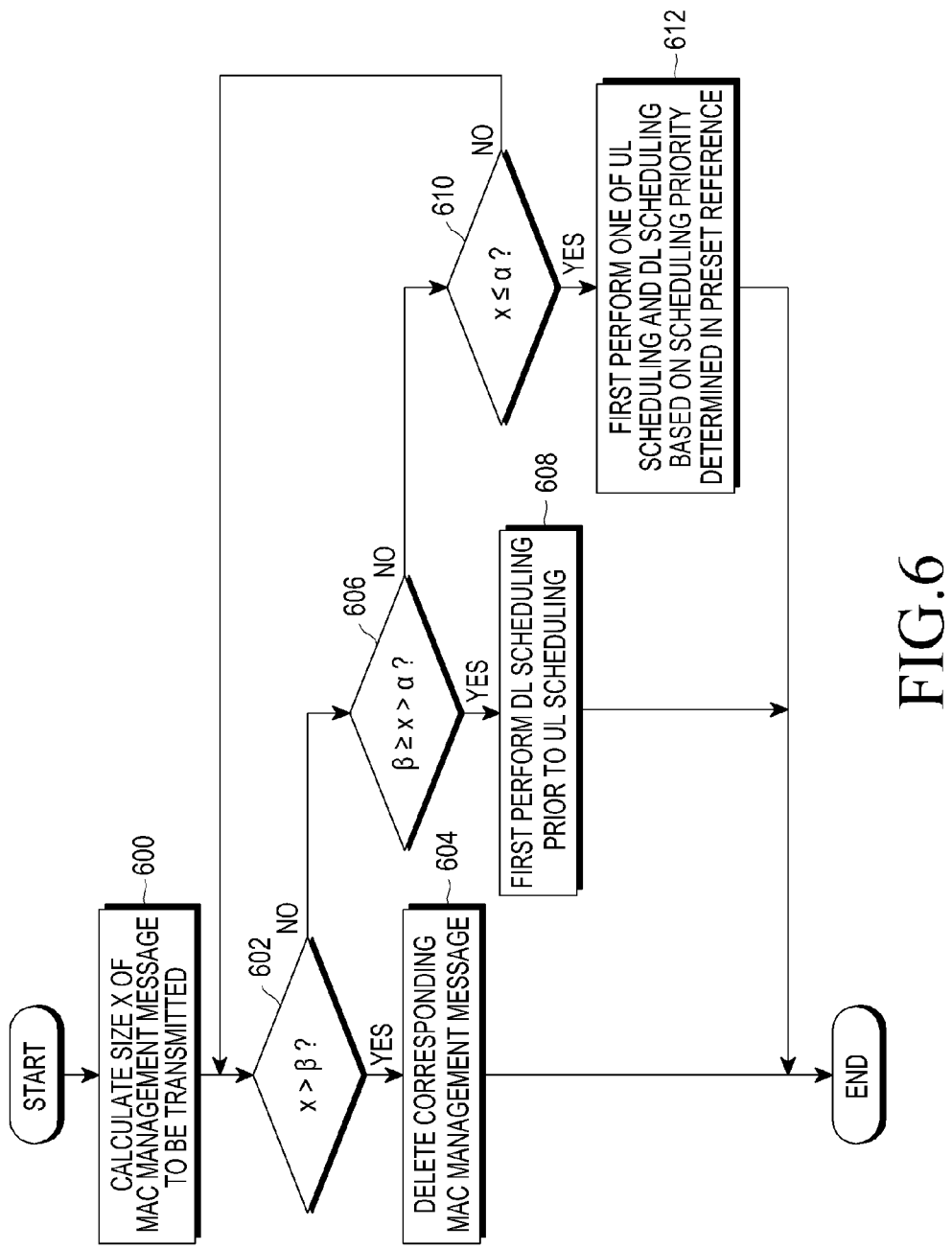
FIG. 6 is a flowchart illustrating an operation process of a base station of a wireless communication system according to an exemplary embodiment of the present invention.

FIG. 6 is a flowchart illustrating an operation process of a base station of a wireless communication system according to an exemplary embodiment of the present invention.

Referring to FIG. 6, in step 600, the base station calculates the size x of a MAC management message to be transmitted. In step 602, the base station determines if the size x is larger than the size β of a maximal DL data burst that is transmitted when the DL scheduling is first performed prior to the UL scheduling.

If it is determined in step 602 that the size x is larger than the size β, in order to prevent the sequential delay of the transmission of the DL data burst to be transmitted next, the base station deletes and discards a corresponding DL MAC management message from a message queue in step 604.

On the other hand, if it is determined in step 602 that the size x is equal to or less than the size β, the base station proceeds to step 606. In step 606, the base station determines if the size x is larger than the size α of a maximal DL data burst that is transmitted when the UL scheduling is first performed prior to the DL scheduling.

If it is determined in step 606 that the size x is equal to or less than the size β and is larger than the size α, the base station first performs the DL scheduling prior to the UL scheduling in step 608. This is because when the UL scheduling is first performed, a region to which the DL data burst is to be allocated in the DL sub frame decreases due to the UL-MAP region, so that the transmission of the DL data burst may be interrupted. Therefore, it is preferred to perform the DL scheduling first and minimize a size of the UL-MAP region.

On the other hand, if it is determined in step 606 that the size x is equal to or less than the size β and is not larger than the size α, the base station determines in step 610 if the size x is equal to or less than the size α in step 608. If it is determined in step 610 that the size x is equal to or less than the size α, the base station determines a priority of the DL scheduling and the UL scheduling in accordance with a preset reference and first performs one of the DL scheduling and the UL scheduling based on the determined scheduling priority in step 612. In an exemplary implementation, step 612 is performed through a process illustrated in FIG. 7.

Figure 7:
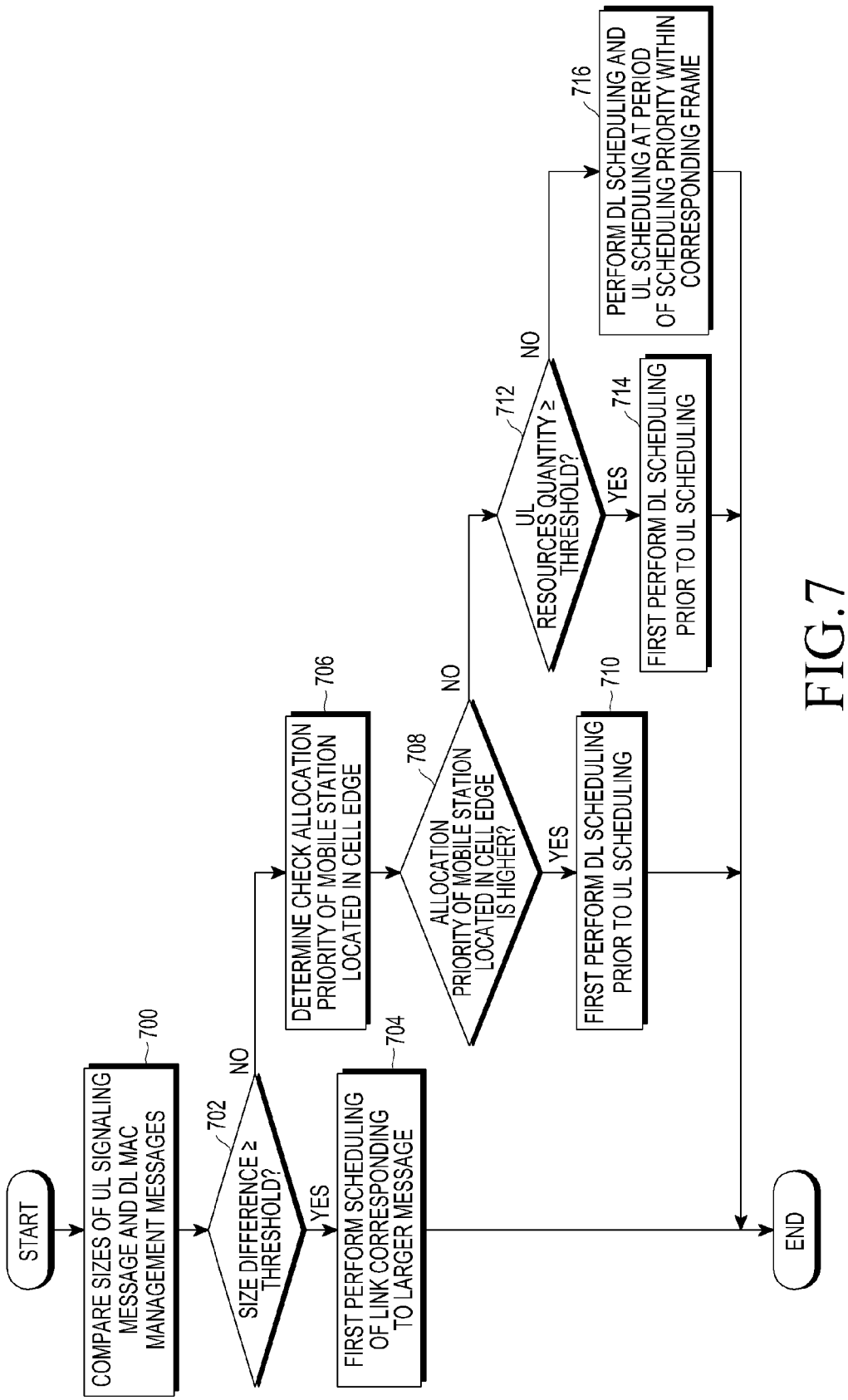
FIG. 7 is a flowchart illustrating a process of determining a performance order of UL scheduling and DL scheduling by a base station in a wireless communication system according to an exemplary embodiment of the present invention.

FIG. 7 is a flowchart illustrating a process of determining a performance order of the UL scheduling and the DL scheduling by a base station in a wireless communication system according to an exemplary embodiment of the present invention.

Referring to FIG. 7, in step 700, the base station compares a size of the UL signaling message related to an operation of the base station and the mobile station stored in a buffer with a size of DL MAC management message. In step 702, the base station determines if a size difference between the UL signaling message and the DL MAC management message is equal to or larger than a threshold value.

This is because the UL signaling message and the DL MAC management message must be preferentially processed in comparison to a general data burst, such as a response message. Further, this is because the UL signaling message and the DL MAC management message cannot be fragmentized.

In this respect, if the base station determines in step 702 that the size difference between the UL signaling message and the DL MAC management message is equal to or larger than the threshold value, the base station first performs the scheduling of a link corresponding to the larger of the two messages in step 704.

Accordingly, the base station can immediately transmit the MAC management message that cannot be fragmentized to the mobile station without delay or interruption.

On the other hand, if the base station determines in step 702 that the size difference between the UL signaling message and the DL MAC management message is less than the threshold value, the base station determines an allocation priority of the mobile station located in the edge of the cell in step 706.

In step 708, the base station determines if the allocation priority of the mobile station located in the edge of the cell is higher than an allocation priority of another mobile station within the cell. If it is determined in step 708 that the allocation priority of the mobile station located in the edge of the cell is higher than the allocation priority of the other mobile station within the cell, the base station first performs the DL scheduling prior to the UL scheduling in step 710.

In contrast, if it is determined in step 708 that that the allocation priority of the mobile station located in the edge of the cell is equal to or lower than the allocation priority of another mobile station within the cell, the base station proceeds to step 712. In step 712, the base station determines a quantity of remaining UL resources and determines if the quantity of remaining UL resources is larger than a threshold value.

If it is determined in step 712 that the quantity of remaining UL resources is larger than the threshold value, the base station determines that there are not many data bursts to be transmitted through the UL. Therefore, it is preferable to collect the UL data bursts in a single frame and transmit the collected UL data bursts so as to reduce the UL-MAP overhead. Therefore, when the quantity of UL resources is equal to or larger than the threshold value, the base station first performs the DL scheduling prior to the UL scheduling in step 714.

On the other hand, if it is determined in step 712 that the quantity of remaining UL resources is less than the threshold value, the base station performs the UL scheduling and the DL scheduling in accordance with a period of a scheduling priority within a corresponding frame in step 716.

That is, except for the situation in which the size difference between the UL signaling message and the MAC management message is less than the threshold value, the allocation priority of the mobile station located within the cell edge is lower than the allocation priority of the other mobile station within the cell, and the quantity of UL resources is less than the threshold value, the base station preferentially performs the corresponding scheduling between the UL scheduling and the DL scheduling in accordance with a predetermined change period of the scheduling priority.

Through the performance of the above exemplary process, the base station can prevent the waste of the UL resources and address the problem of the transmission interruption of the DL data burst.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for resource allocation scheduling by a base station in a wireless communication system, the method comprising:

if UpLink (UL) scheduling for scheduling an allocation order of UL resources is performed prior to DownLink (DL) scheduling for scheduling an allocation order of DL resources, setting a size α representing a size in which a DL burst region is maximally allocated in a DL sub frame;

if the DL scheduling is performed prior to the UL scheduling, setting a size β representing a size in which the DL burst region is maximally allocated in the DL sub frame;

determining whether to discard a DL Medium Access Control (MAC) management message to be transmitted by using the size β; and if it is determined not to discard the DL MAC management message, determining a priority of DL scheduling and UL scheduling by using the size α and first performing one of the DL scheduling and the UL scheduling in accordance with the determined priority.

2. The method as claimed in claim 1, wherein, if a DL-MAP region is allocated having a minimal size in the DL sub frame region, and a UL-MAP region is allocated having a size according to an average quantity of allocated UL resources during a preset time interval in the DL sub frame region, the size α represents a size in which the DL burst region is maximally allocated in the DL sub frame region except for a preamble region.

3. The method as claimed in claim 1, wherein, if a DL-MAP region is allocated having a minimal size in the DL sub frame region, and a UL-MAP region is not allocated in the DL sub frame region, the size β represents a size in which the DL burst region is maximally allocated in the DL sub frame region except for a preamble region.

4. The method as claimed in claim 1, wherein the determining of whether to discard the DL MAC management message comprises:
  comparing a size of the DL MAC management message with the size β; and
  if the size of the DL MAC management message is larger than the size β, determining to discard the DL MAC management message.

5. The method as claimed in claim 1, wherein the determining of the priority of the DL scheduling and the UL scheduling by using the size α comprises:
  comparing a size of the DL MAC management message with the size α; and
  if the size of the DL MAC management message is larger than the size α, determining to perform the DL scheduling prior to the UL scheduling.

6. The method as claimed in claim 1, wherein the first performing of one of the DL scheduling and the UL scheduling comprises:
  comparing a size of the DL MAC management message with the size α;
  if the size of the DL MAC management message is equal to or less than the size α, determining if a size difference between a stored MAC management message and a UL signaling message related to an operation of the base station or a mobile station is equal to or larger than a first threshold value;
  if the size difference between the stored MAC management message and the UL signaling message is equal to or larger than the first threshold value, selecting a larger message of the stored MAC management message and the UL signaling message;
  if the selected message is the UL signaling message, performing the UL scheduling prior to the DL scheduling; and
  if the selected message is the stored MAC management message, t performing the DL scheduling prior to the UL scheduling.

7. The method as claimed in claim 1, wherein the first performing of one of the DL scheduling and the UL scheduling comprises:
  comparing a size of the DL MAC management message with the size α;
  if the size of the DL MAC management message is equal to or less than the size α, determining if a size difference between a stored MAC management message and a UL signaling message related to an operation of the base station or a mobile station is equal to or larger than a first threshold value;
  if the size difference between the stored MAC management message and the UL signaling message is less than the first threshold value, determining an allocation priority of DL resources for a mobile station located in an edge of a cell among mobile stations within the cell; and
  if the determined allocation priority is higher than an allocation priority of a different mobile station within the cell, performing the DL scheduling prior to the UL scheduling.

8. The method as claimed in claim 1, wherein the first performing of one of the DL scheduling and the UL scheduling comprises:
  comparing a size of the DL MAC management message with the size α;
  if the size of the DL MAC management message is equal to or less than the size α, determining if a size difference between a stored MAC management message and a UL signaling message related to an operation of the base station or a mobile station is equal to or larger than a first threshold value;
  if the size difference between the stored MAC management message and the UL signaling message is less than the first threshold value, determining an allocation priority of DL resources for a mobile station located in an edge of a cell among mobile stations within the cell;
  if the determined allocation priority is equal to or lower than an allocation priority of a different mobile station within the cell, determining if a quantity of UL resources is equal to or larger than a second threshold value; and
  if the quantity of UL resources is equal to or larger than the second threshold value, performing the DL scheduling prior to the UL scheduling.

9. The method as claimed in claim 1, wherein the first performing of one of the DL scheduling and the UL scheduling comprises:
  comparing a size of the DL MAC management message with the size α;
  if the size of the DL MAC management message is equal to or less than the size α, determining if a size difference between a stored MAC management message and a UL signaling message related to an operation of the base station or a mobile station is equal to or larger than a first threshold value;
  if the size difference between the stored MAC management message and the UL signaling message is less than the first threshold value, determining an allocation priority of DL resources for a mobile station located in an edge of a cell among mobile stations within the cell;
  when the determined allocation priority is equal to or lower than an allocation priority of a different mobile station within the cell, determining if a quantity of UL resources is equal to or larger than a second threshold value; and if the quantity of UL resources is less than the second threshold value, first performing one of the DL scheduling and the UL scheduling in accordance with a preset change period of a scheduling priority.

10. An apparatus for resource allocation scheduling in a wireless communication system, the apparatus comprising:
a memory for storing a Medium Access Control (MAC) management message; and
a scheduler for, if an UpLink (UL) scheduling for scheduling an allocation order of UL resources is performed prior to a DownLink (DL) scheduling for scheduling an allocation order of DL resources, setting size α representing a size in which a DL burst region is maximally allocated in a DL sub frame, for, if the DL scheduling is performed prior to the UL scheduling, setting a size β representing a size in which the DL burst region is maximally allocated in the DL sub frame, for determining whether to discard a DL MAC management message to be transmitted by using the size β, and for, if it is determined not to discard the DL MAC management message, determining a priority of a DL scheduling and a UL scheduling by using the size α and first performing one of the DL scheduling and the UL scheduling in accordance with the determined priority.

11. The apparatus as claimed in claim 10, wherein when a DL-MAP region is allocated having a minimal size in the DL sub frame region, and a UL-MAP region is allocated having a size according to an average quantity of allocated UL resources during a preset time interval in the DL sub frame region, the size α represents a size in which the DL burst region is maximally allocated in the DL sub frame region except for a preamble region.

12. The apparatus as claimed in claim 10, wherein, if a DL-MAP region is allocated having a minimal size in the DL sub frame region, and a UL-MAP region is not allocated in the DL sub frame region, the size β represents a size in which the DL burst region is maximally allocated in the DL sub frame region except for a preamble region.

13. The apparatus as claimed in claim 10, wherein the scheduler compares a size of the DL MAC management message with the size β, and if the size of the DL MAC management message is larger than the size β, the scheduler determines to discard the DL MAC management message.

14. The apparatus as claimed in claim 10, wherein the scheduler compares a size of the DL MAC management message with the size α, and if the size of the DL MAC management message is larger than the size α, the scheduler determines to perform the DL scheduling prior to the UL scheduling.

15. The apparatus as claimed in claim 10, wherein the memory stores a UL signaling message related to an operation of a mobile station.

16. The apparatus as claimed in claim 15, wherein the scheduler compares a size of the DL MAC management message with the size α, and if the size of the DL MAC management message is equal to or less than the size α, the scheduler determines if a size difference between the stored MAC management message and the UL signaling message is equal to or larger than a first threshold value, if the size difference between the stored MAC management message and the UL signaling message is equal to or larger than the first threshold value, the scheduler selects a larger message of the stored MAC management message and the UL signaling message, if the selected message is the UL signaling message, the scheduler performs the UL scheduling prior to the DL scheduling, and if the selected message is the stored MAC management message, the scheduler performs the DL scheduling prior to the UL scheduling.

17. The apparatus as claimed in claim 15, wherein the scheduler compares a size of the DL MAC management message with the size α, if the size of the DL MAC management message is equal to or less than the size α, the scheduler determines if a size difference between the stored MAC management message and the UL signaling message is equal to or larger than a first threshold value, if the size difference between the stored MAC management message and the UL signaling message is less than the first threshold value, the scheduler determines an allocation priority of DL resources for a mobile station located in an edge of a cell among mobile stations within the cell, and if the determined allocation priority is higher than an allocation priority of a different mobile station within the cell, the scheduler performs the DL scheduling prior to the UL scheduling.

18. The apparatus as claimed in claim 15, wherein the scheduler compares a size of the DL MAC management message with the size α, if the size of the DL MAC management message is equal to or less than the size α, the scheduler determines if a size difference between the stored MAC management message and the UL signaling message is equal to or larger than a first threshold value, if the size difference between the stored MAC management message and the UL signaling message is less than the first threshold value, the scheduler determines an allocation priority of DL resources for a mobile station located in an edge of a cell among mobile stations within the cell, if the determined allocation priority is equal to or lower than an allocation priority of a different mobile station within the cell, the scheduler determines if a quantity of UL resources is equal to or larger than a second threshold value, and if the quantity of UL resources is equal to or larger than the second threshold value, the scheduler performs the DL scheduling prior to the UL scheduling.

19. The apparatus as claimed in claim 15, wherein the scheduler compares a size of the DL MAC management message with the size α, if the size of the DL MAC management message is equal to or less than the size α, the scheduler determines if a size difference between the stored MAC management message and the UL signaling message is equal to or larger than a first threshold value, if the size difference between the stored MAC management message and the UL signaling message is less than the first threshold value, the scheduler determines an allocation priority of DL resources for a mobile station located in an edge of a cell among mobile stations within the cell, if the determined allocation priority is equal to or lower than an allocation priority of a different mobile station within the cell, the scheduler determines if a quantity of UL resources is equal to or larger than a second threshold value, and if the quantity of UL resources is less than the second threshold value, the scheduler first performs one of the DL scheduling and the UL scheduling in accordance with a preset change period of a scheduling priority.

* * * * *